United States Patent
Tom et al.

(10) Patent No.: US 8,386,814 B2
(45) Date of Patent: Feb. 26, 2013

(54) CONTINUOUS MONITORING OF A USB CLIENT FOR BATTERY CHARGING SPECIFICATION CHARGING CAPACITY

(75) Inventors: Steven R. Tom, Dallas, TX (US); Leland Scott Swanson, McKinney, TX (US); Roy Alan Hastings, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 270 days.

(21) Appl. No.: 12/816,259

(22) Filed: Jun. 15, 2010

(65) Prior Publication Data
US 2011/0016341 A1    Jan. 20, 2011

Related U.S. Application Data

(60) Provisional application No. 61/226,989, filed on Jul. 20, 2009.

(51) Int. Cl.
- *G06F 1/00* (2006.01)
- *G06F 13/42* (2006.01)
- *G06F 13/14* (2006.01)
- *H02J 1/12* (2006.01)
- *H02J 7/00* (2006.01)
- *G05F 3/06* (2006.01)
- *H02M 7/00* (2006.01)

(52) U.S. Cl. .......... 713/300; 307/45; 307/151; 320/107; 320/137; 363/13; 710/105; 710/305

(58) Field of Classification Search ................... 713/300; 307/45, 151; 320/107, 137; 363/13; 710/105, 710/305
See application file for complete search history.

(56) References Cited

U.S. PATENT DOCUMENTS

| | | | | |
|---|---|---|---|---|
| 6,946,817 B2 * | 9/2005 | Fischer et al. | ................ | 320/132 |
| 7,675,571 B2 * | 3/2010 | Cheng et al. | ................. | 348/375 |
| 7,711,975 B2 * | 5/2010 | Choate | ......................... | 713/600 |
| 7,882,288 B2 * | 2/2011 | Moosavi | ...................... | 710/106 |
| 7,895,385 B2 * | 2/2011 | Raju | ............................. | 710/305 |

OTHER PUBLICATIONS

Pending U.S. Appl. No. 12/774,549, filed May 5, 2010 for "Auto-Detecting Polling for Correct Handshake to USB Client" of Steven R. Tom et al., pp. 1-37.

* cited by examiner

*Primary Examiner* — Stefan Stoynov
(74) *Attorney, Agent, or Firm* — William B. Kempler; Wade J. Brady, III; Frederick J. Telecky, Jr.

(57) ABSTRACT

An embodiment of the invention provides a method for continuously detecting when a USB client device may be charged according to a BCS charging standard. Power is supplied from a USB host device to the USB client device with a first current limit. Next, the USB host device monitors data lines D+ and D− for a first part of a handshake. When the first part of the handshake is detected, a second part of the handshake is provided by the USB host device indicating that the USB client device may be changed according to the BCS charging standard. All current sources and all voltage sources that are coupled to the data lines D+ and D− are decoupled from data lines D+ and D− after the handshake is complete. After the data lines are decoupled, communication may begin between the USB host device and the USB client device.

20 Claims, 6 Drawing Sheets

CONTINUOUS MONITORING OF A USB CLIENT FOR BATTERY CHARGING SPECIFICATION CHARGING CAPACITY

BACKGROUND

Many portable, battery-powered devices (e.g. mobile handsets, keyboards, personal digital assistants) recharge their batteries through dedicated charging ports such as an AC-to-DC (alternating current to direct current) wall-wart adapter. A wall-wart adapter is small power supply brick with an integral male plug. The wall-wart is designed to plug directly into a wall outlet. It is called a "wart" because when it is installed on a power strip it tends to block at least one more socket than it uses. These portable, battery-powered devices may also recharge their batteries through a standard host port. A standard host port usually has a five volt power supply provided from the USB (universal serial bus) ports on PCs (personal computers) such as laptop, desktop and notebook PCs. Commonly, the portable device has only one input which (s designed for USB compatibility in order to save space (as opposed to having a separate wall-wart connector).

Usually, a standard host port has a current limit of 500 ma (milliamps) while a BCS (Battery Charging Specification) compliant host port can provide much more current. For example, some BCS compliant host ports can provide 1.5 amps to a portable device. Because many portable devices cannot differentiate when they are plugged into a standard host port versus a BCS compliant host port, most portable devices limit the amount of current they draw to ensure that the portable devices do not overload the host port.

Several recent standards have defined protocols that allow a portable device to differentiate between different power sources to allow the portable device to drawn maximum current from a host port. Drawing maximum power from a host port reduces the time required to charge the portable device. Several recently released industry standards such as the Chinese PRC Telecommunications Industry Standard YD/T 1591-2006 and USB 2.0 Battery Charging Specification 1.1 (BSC1.1) define both power sources, handshaking protocols and allowable current draws for host ports. Other proprietary-based schemes (such as Apple's method for charging iPods and iPhones) are company specific. These standards define how a portable device communicates with a host port to determine the maximum allowable current draw.

DETAILED DESCRIPTION

The drawings and description, in general, disclose embodiments of a method and apparatus for continuously detecting when a USB client device (portable device) may be charged according to a BCS (battery charging standard) standard. In summary, a handshake circuit on the USB host device (standard host port capable of higher current output than the USB standard minimum requires) monitors when the USB client device provides a first part of a handshake. After the first part of the handshake is provided, the handshake circuit provides a second part of the handshake to the USB client device indicating that the USB client device may be charged according to a BCS standard.

When the first part of the handshake is not provided by the USB client device, enumeration may begin. Enumeration is the process of detecting, identifying and loading drivers for a USB device. After enumeration, communication between the USB client device and the USB host device starts. After communication begins, the handshake circuit continues to monitor for a first part of a handshake send by a USB client device. When the USB client device is electrically detached from the USB host device, the handshake circuit continues to monitor the data lines D+ and D− for a handshake from a USB client device.

When the first part of the handshake is provided by the USB client device and the second part of the handshake is provided by the USB host device, the USB client device may draw a charging current according to a BCS standard. After the USB client device is charging according to the BCS charging standard, enumeration may begin. After enumeration, communication between the USB host device and the USB client device may begin. After communication begins, the handshake circuit continues to monitor for a first part of a handshake sent by a USB client device. When the USB client device is electrically detached from the USB host device, the handshake circuit continues to monitor the data lines D+ and D− for a handshake from a USB client device.

Figure 1:
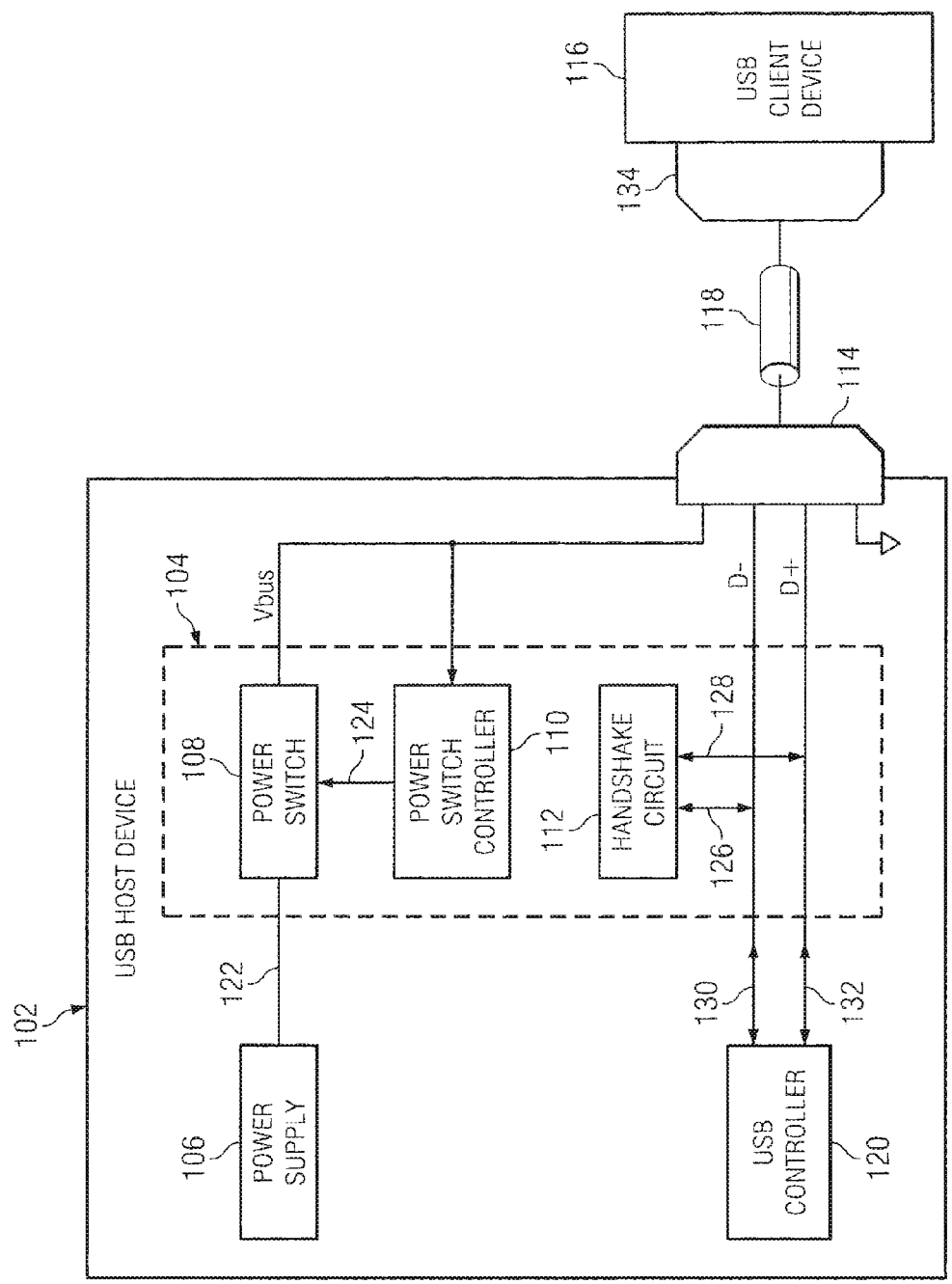
FIG. 1 is a schematic diagram of an embodiment of a USB host device for continuously detecting when a USB client device may be charged according to a BCS (Battery Charging Standard) standard.

FIG. 1 is a schematic diagram of an embodiment of a USB host device 102 for continuously detecting when a USB client device 116 may be charged according to a BCS standard. A USB host device 102 includes but is not limited to a desktop computer, a laptop computer and a notebook computer. A USB client device 116 includes but is not limited to a mobile handset, a keyboard and a PDA (personal digital assistant). In this embodiment, the USB host device 102 includes a power supply 106, a USB controller 120, a power switch 108, a power switch controller 110, a handshake circuit 112 and a USB connector 114.

In this embodiment, a USB cable 118 electrically connects the USB connector 114 to the USB connector 134 on the USB client device 116. The power switch 108, the power switch controller 110 and the handshake circuit 112 may be integrated on a single integrated circuit 104.

In this embodiment, the Vbus is connected to the power switch 108, the power switch controller 110 and the USB connector 114. The Vbus is used to transfer power from the power supply 106 to the USB client device 116 when the power switch 108 is closed. A power switch 108 may be implemented using transistors such as MOSFETs (metal-oxide semiconductor field-effect transistors), bipolar transistors and JFETs (junction field-effect transistors). The power switch 108 is controlled by the power switch controller 110 through electrical connection 124. The power switch controller circuit 110 also senses the current drawn through the Vbus and as a result controls how much current that can be drawn. The amount of current drawn by the client through the Vbus is dependent on a BCS standard for the USB host device 102 connected to the USB client device 116.

In this embodiment, the power switch controller 110 includes a charge pump and current-limit circuitry (not shown). The power supply 106 is electrically connected to the power switch 108 through connection 122. The power supply 106 may supply current at any voltage. In this embodiment, the voltage of the power supply 106 is approximately 5 volts.

The handshake circuit 112 monitors voltages applied to data lines D+ and D− through electrical connections 128 and 126 respectively. The handshake circuit 112 also applies voltages to data line D− through electrical connection 126. The handshake circuit 112 also draws current from data line. D+ though electrical connection 128.

Data lines D+ and D−, along with Vbus and ground, are electrically connected to USB connector 114. A USB cable 118 electrically connects USB connector 114 to the USB connector 134 mounted on the USB client device 116.

In this embodiment, when a USB client device 116 is electrically coupled to the USB host device 102, the USB client device 116 provides a first handshake according to USB Battery Charging Specification 1.1 to data lines D+ and D−. In this example, the first handshake includes applying a voltage in the range of 0.4 volts to 0.7 volts to the D+ data line for a time period T1 and applying no communication on the data lines D+ and D− for the time period T1.

In one embodiment, applying no communication on the data lines D+ and D− means keeping the average voltage on the data line D− below 0.130 volts. In another embodiment, applying no communications on the data lines means applying no high-speed transitions (e.g. 480 Mbits/sec or higher). In another embodiment, applying no communications means no logical crossings on either data lines D+ and D−. The time period T1, for example, may range from 1 ms (milliseconds) to 20 ms.

The second part of the handshake includes the handshake circuit 112 drawing current from the D+ data line to ground. In this example, the current drawn from the D+ data line to ground ranges from 50 micro-amps to 150 micro-amps. The second part of the handshake further includes waiting a time period T2 after drawing current from the D+ data line to ground. In this example, the time period T2 is approximately 1 millisecond. After waiting for time period T2, the handshake circuit 112 discontinues monitoring the D− data line.

As part of the second part of the handshake, the handshake circuit 112 determines if the first part of the handshake is currently applied after waiting a time period T3. In this example, the time period T3 is approximately 256 microseconds. When it is determined that the first handshake is currently applied, the handshake circuit 112 applies a voltage of approximately 0.6 volts to the D− data line as part of the second part of the handshake. In this embodiment, the handshake is complete when the USB client device 116 drives the voltage on D+ outside of the voltage range of 0.4 volts to 0.7 volts, the handshake circuit 112 waits for a time period T4, and the to handshake circuit 112 decouples all voltage sources and all current sources in the handshake circuit 112 that are coupled to the data lines D+ and D− from the data lines D+ and D−. In this embodiment, the time period T4 is approximately 1 ms. When the handshake is complete, enumeration may begin.

In one embodiment, after the handshake is complete, the USB client device 116 will accept charging current from the USB host device 102 according to the proper BCS charging standard. Power is supplied by the power supply 106 through electrical connection 122 into power switch 108. Power switch 108 is enabled by control circuit 110. When power switch 108 is enabled, current is drawn from the power supply 106 through the Vbus to charge the USB client device 116. The current drawn from the power supply 106 is also sensed by the power switch controller 110.

While the USB client device 116 begins charging, communication may also begin. In one example, communication includes the USB client device 116 sending data on the data lines D+ and D− to the USB controller 120 and the USB controller 120 sending data on the data lines D+ and D− to the USB client device 116.

When the handshake is not complete, enumeration may begin. Enumeration begins when the voltage on D+ is driven outside of the voltage range of 0.4 volts to 0.7 by the client device 116. After enumeration begins, communication may start between the USB client device 116 and the USB controller 120. In this example, communications includes the USB client device 116 sending data on the data lines D+ and D− to the USB controller 120 and the USB controller 120 sending data on the data lines D+ and D− to the USB client device 116.

The handshake circuit 112 detects when enumeration begins and as a result, decouples (not shown in FIG. 1) voltage sources and current sources in the handshake circuit 112 currently coupled to the data lines D+ and D− from data lines D+ and D−. Decoupling the voltage sources and the current sources from the data lines D+ and D− increases the impedance on the data lines D− and D+ respectively. Increasing the impedance on the data lines D+ and D− improves the bandwidth with which data may be sent and received by the USB host device 102 and the USB client device 116.

When a currently connected USB client device 116 is electrically disconnected, the USB host device 102 is unaffected. If another USB client device 116 is subsequently electrically connected, the process begins again with the USB client device 116 sending a first part of the handshake.

Figure 2:
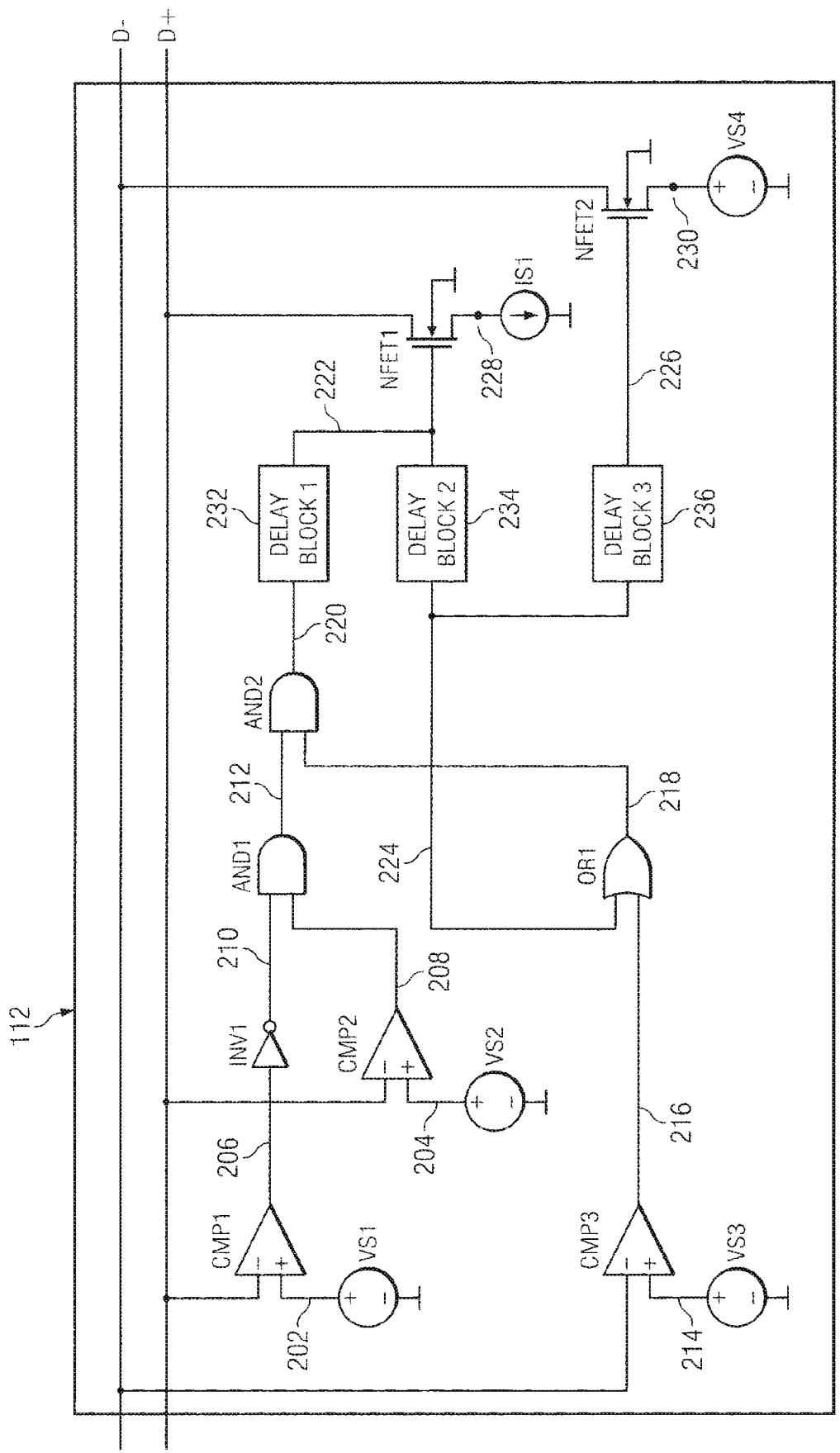
FIG. 2 is a schematic diagram of a first embodiment of a handshake circuit.

FIG. 2 is a schematic diagram of an embodiment of a first handshake circuit 112. In this embodiment, a first comparator CMP1 has one input connected to data line D+ and another input connected to node 202. A voltage source VS1 is also connected to node 202. In this embodiment, the voltage source VS1 is approximately 0.4 volts. The output of comparator CMP1 is connected to node 206. The input to inverter INV1 is also connected to node 206. Also in this embodiment, a second comparator CMP2 has one input connected to data line D+ and another input connected to node 204. A voltage source VS2 is also connected to node 204. In this embodiment, the voltage source VS2 is approximately 0.7 volts.

Also in this embodiment, a third comparator CMP3 has one input to connected to data line D− and another input connected to node 214. A voltage source VS3 is also connected to node 214. In this embodiment, the voltage source VS3 is approximately 0.13 volts. The output of the third comparator CMP3 is connected to an input of a two-input OR gate OR1 at node 216. The output of the inverter INV1 is connected to the first input of the two-input AND gate AND1 at node 210. The output of the second comparator CMP2 is connected to the second input of AND1 at node 208.

The output of AND1 is connected to an input of a two-input AND gate AND2 at node 212 and the output of OR1 is connected to the other input of AND2 at node 218. The output AND2 is connected to the input of the delay block1 232 at node 220. The output of delay block1 232 is connected to the input of delay block2 234 and the gate of NFET NFET1 at node 222. The output of delay block2 234 is connected to the input of delay block3 236 and to an input of OR1 at node 224. The output of delay block3 236 is connected to the gate of NFET NFET2 at node 226.

In this first embodiment of handshaking circuit 112, a current source IS1 is connected to the source of NFET1 at node 228. The drain of NFET1 is connected to data line D+ and the body of NFET1 is connected to ground. The fourth voltage source VS4 is connected to the source of NFET2 at node 230. The drain of NFET2 is connected to data line D− and the body of NFET2 is connected to ground.

In this embodiment, when the USB client device 116 applies a voltage on data line D+ in the range of 0.4 volts to 0.7 volts (part of the first part of the handshake), the output of the comparator CMP1 is a logical low to value that is inverted to a logical high value by the inverter INV1. The output of the comparator CMP2 is a logical high value. As a result, the two inputs to AND1 are logical high values and the output of AND1 is a logical high value.

In the first embodiment of the handshake circuit 112, when the USB client device 116 does not apply an average voltage equal to or greater than 0.130 volts (another part of the first part of the handshake), the output of the comparator CMP3 is a logical high value that is also an input to OR1. Because at least one input to OR1 is a logical high value, the output of OR1 is a logical high value. Since node 212 and node 218 are both logical high values, the output 220 of AND2 is a logical high value.

Further in accordance with the first embodiment of the handshake circuit 112, when a logical high value is applied at node 220, the logical high value is propagated through delay block1 232. The delay time T1 through delay block1 232, in this example, ranges from 1 ms to 20 ms. After the logical high value is applied at node 222, NFET1 turns on and the current source IS1 is coupled to data line D+. In this example, the current source IS1 may draw current in the range of 50 micro-amps to 150 micro-amps. A logical high value is propagated through delay block2 234 to node 224. The delay time T2 through delay block2 234, in this example, is approximately 1 millisecond. However, other values for T2 may be used.

Because node 224 is a logical high value, the logical value on node 216 does not determine the logical value of the output of OR1. As a consequence, while node 224 remains high, the comparator CMP3 no longer monitors the D− data line. The logical high value on node 224 is propagated through delay block3 236 with a time delay T3. The time delay T3, in this example, is approximately 256 micro-seconds. However, other values for T3 may be used. When a logical high value is applied to node 226, NFET2 turns on and voltage source VS4 is applied to data line D−. In this embodiment, the voltage source VS4 is approximately 0.6 volts.

Applying approximately 0.6 volts by the handshake circuit 112 on data line D− is part of the second part of the handshake. In this embodiment, the handshake is complete when the USB client device 116 drives the voltage on D+ outside of the voltage range of 0.4 volts to 0.7 volts, the handshake circuit 112 waits for a time period T4, and the handshake circuit 112 decouples all voltage sources and all current sources in the handshake circuit 112 that are coupled to the data lines D+ and D− from the data lines D+ and D−.

The time delay T4, in this example, is the time it takes for the transition of a logical high value to a logical low value to propagate through delay block1 232, delay block2 234, and delay block3 236. In this embodiment, the time period T4 is approximately 1 ms with most of the delay occurring in delay block1 232. However, the total delay time T4 may be apportioned between the delay blocks 232, 234 and 236 in other ways as well. When the handshake is complete, the USB client device 116 may begin to draw charging current from the US host device 102 according to a BCS standard.

In one embodiment, enumeration starts when the USB client device 116 applies a logical high value on the D+ line data line. When, for example, a logical high value (e.g. 3.0 volts or higher) is applied by the USB client device 116 to data line D+, the comparator CMP2 outputs a logical low value. The logical low value on the input of AND2 drives the output of AND2 to a logical low value. The logical low value is propagated through the three delay blocks 232, 234 and 236 causing the two NFETs, NFET1 and NFET2, to turn off. Turning off NFET1 decouples the current source IS1 from the D+ data line. Turning off NFET2 decouples the voltage source VS4 from the D− data line.

In this embodiment, when the current source IS1 and the voltage source VS4 are decoupled from data line D+ and data line D− respectively, the USB client device 116 and the USB host device 102 may begin communication between each other. When the USB client device 116 is electrically removed, the state of handshake circuit 112 does not change. The state of the handshake will not change until a USB client device 116 is connected to the USB host device 102 and the USB client device 116 provides the first part of the handshake.

Figure 3:
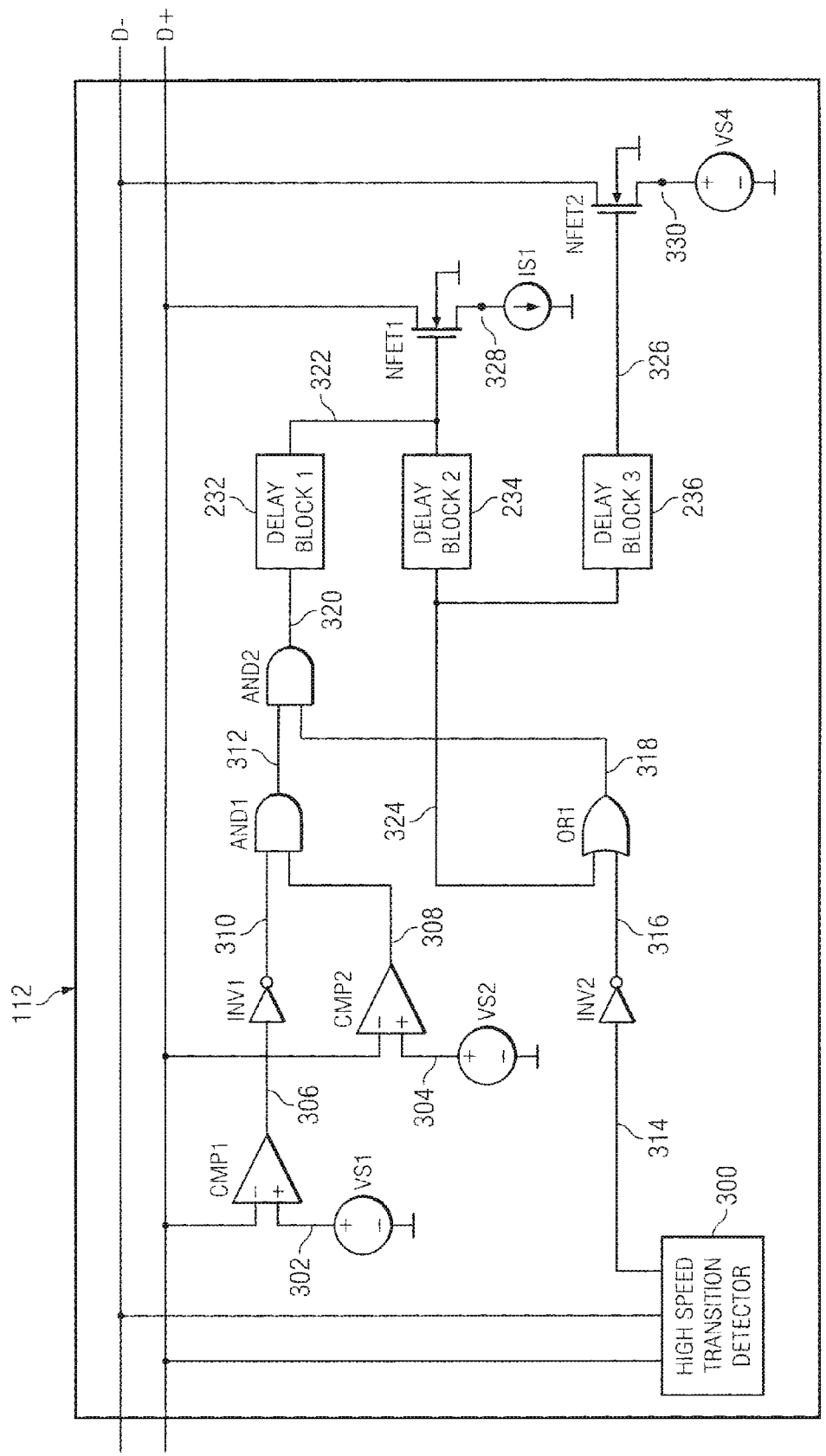
FIG. 3 is a schematic diagram of a second embodiment of a handshake circuit.

FIG. 3 is a schematic diagram of an embodiment of a second handshake circuit 112. In this embodiment, a first comparator CMP1 has one input connected to data line D+ and another input connected to node 302. A voltage source VS1 is also connected to node 302. In this embodiment, the voltage source VS1 is approximately 0.4 volts. The output of comparator CMP1 is connected to node 306. The input to inverter INV1 is also connected to node 306. Also in the second embodiment of a handshake circuit 112, a second comparator CMP2 has one input connected to data line D+ and another input connected to node 304. A voltage source VS2 is also connected to node 304. In this embodiment, the voltage source VS2 is approximately 0.7 volts.

Also in this embodiment, a high speed transition detector 300 has one input connected to data line D+ and the other input connected to data line D−. The output of the high speed transition detector 300 is connected to the input of the inverter INV2 at node 314. The output of the inverter INV2 is connected to an input of a two-input OR gate OR1 at node 316. The output of the inverter INV1 is connected to the first input of a two-input AND gate AND1 at node 310. The output of the second comparator CMP2 is connected to the second input of AND1 at node 308.

The output of AND1 is connected to an input of a two-input AND gate AND2 at node 312 and the output of OR1 is connected to the other input of AND2 at node 318. The output of AND2 is connected to the input of delay block1 232 at node 320. The output of delay block1 232 is connected to the input of delay block2 234 and the gate of NFET NFET1 at node 322. The output of delay block2 234 is connected to the input of delay block3 236 and to an input of OR1 at node 324. The output of the delay block3 236 is connected to the gate of NFET NFET2 at node 326.

In the second embodiment of a handshaking circuit 112, a current source IS1 is connected to the source of NFET1 at node 328. In this example, the current source IS1 draws current in a range from 50 micro-amps to 150 micro-amps. The drain of NFET1 is connected to data line D+ and the body of NFET1 is connected to ground. The fourth voltage source VS4 is connected to the source of NFET2 at node 330. The voltage source VS4 has a voltage of approximately 0.6 volts. The drain of NFET2 is connected to data line D+ and the body of NFET2 is connected to ground.

In the second embodiment of the handshaking circuit 112, when the USB client device 116 applies a voltage on data line D+ in the range of 0.4 volts to 0.7 volts (part of the first part of the handshake), the output of the comparator CMP1 is a logical low value that is inverted to a logical high value by the inverter INV1. The output of the comparator CMP2 is a logical high value. As result, the two inputs to AND1 are logical high values and the output of AND1 is a logical high value.

The high speed transition detector 300 detects high-speed transitions between data lines D+ and D−. The high speed transition detector 300 is a differential comparator and rectifier/filter that compares voltage differences between data line D− and data line D+. The high speed transition detector 300 outputs a logical high value when transitions are detected between data lines D+ and D−. The high speed transition detector 300 outputs a logical low value when no high speed transitions are detected between data lines D+ and D−.

In the second embodiment of a handshake circuit 112, when the high speed transition detector 300 does not detect high speed transitions, the high speed transition detector 300 outputs a logical low value to inverter INV2 at node 314. The inverter INV2 outputs a logical high value to OR1 at node 316. Because at least one input to the OR1 is a logical high value, the output of OR1 is a logical high value. Since node 312 and node 318 are both logical high values, the output of AND2 is a logical high value.

Further in accordance with the second embodiment of the handshake circuit 112, when a logical high value is applied at node 320, the logical high value is propagated through delay block1 232. The delay time T1 through delay block1 232, in this example, ranges from 1 ms to 20 ms. After the logical high value is applied at node 322, NFET1 turns on and the current source IS1 is coupled to data line D+. In this example, the current source IS1 may draw current in the range of 50 micro-amps to 150 micro-amps. A logical high value is propagated through delay block2 234 to node 324. The delay time T2 through delay block2 234, in this example, is approximately 1 millisecond.

Because node 324 is a logical high value, the logical value on node 316 does not determine the logical value of the output of OR1. As a consequence, while node 324 remains high, the high speed transition detector 300 no longer monitors the data lines D+ and D−. The logical high value on node 324 is propagated through delay block3 236 with a time delay T3. The time delay T3, in this example, is approximately 256 micro-seconds. When a logical high value is applied to node 326, NFET2 turns on and voltage source VS4 is applied to data line D−. In this embodiment, the voltage source VS4 is approximately 0.6 volts.

Applying approximately 0.6 volts by the handshake circuit 112 on data line D− is part of the second part of the handshake. In this embodiment, the handshake is complete when the USB client device 116 drives the voltage on D+ outside of the voltage range of 0.4 volts to 0.7 volts, the handshake circuit 112 waits for a time period T4, and the handshake circuit 112 decouples all voltage sources and all current sources in the handshake circuit 112 that are coupled to the data lines D+ and D− from the data lines D+ and D−.

The time delay T4, in this example, is the time it takes for the transition of a logical high value to a logical low value to propagate through delay block1 232, delay block2 234, and delay block3 226. In this embodiment, the time period T4 is approximately 1 ms with most of the delay occurring in delay block1 232. However, the total delay time T4 may be apportioned between the delay blocks 232, 234 and 236 in other ways as well. When the handshake is complete, the USB client device 116 may begin to draw charging current from the US host device 102 according to a BCS standard.

In one embodiment, enumeration starts when the USB client device 116 applies a logical high value on the D+ line data line. When, for example, a logical high value (e.g. 3.0 volts or higher) is applied by the USB client device 116 to data line D+, the comparator CMP2 outputs a logical low value. The logical low value on the input of AND2 drives the output of AND2 to a logical low value. The logical low value is propagated through the three delay blocks 232, 234 and 236 causing the two NFETs, NFET1 and NFET2, to turn off. Turning off NFET1 decouples the current source IS1 from the D+ data line. Turning off NFET2 decouples the voltage source VS4 from the D− data line.

In this example, when the current source IS1 and the voltage source VS4 are decoupled from data lines D+ and D− respectively, the USB client device 116 and the USB host device 102 may begin communicating with each other. When the USB client device 116 is electrically removed, the state of handshake circuit 112 does not change. The state of the handshake circuit 112 will not change until a USB client device 116 is connected and the USB client device 116 provides the first part of the handshake.

Figure 4:
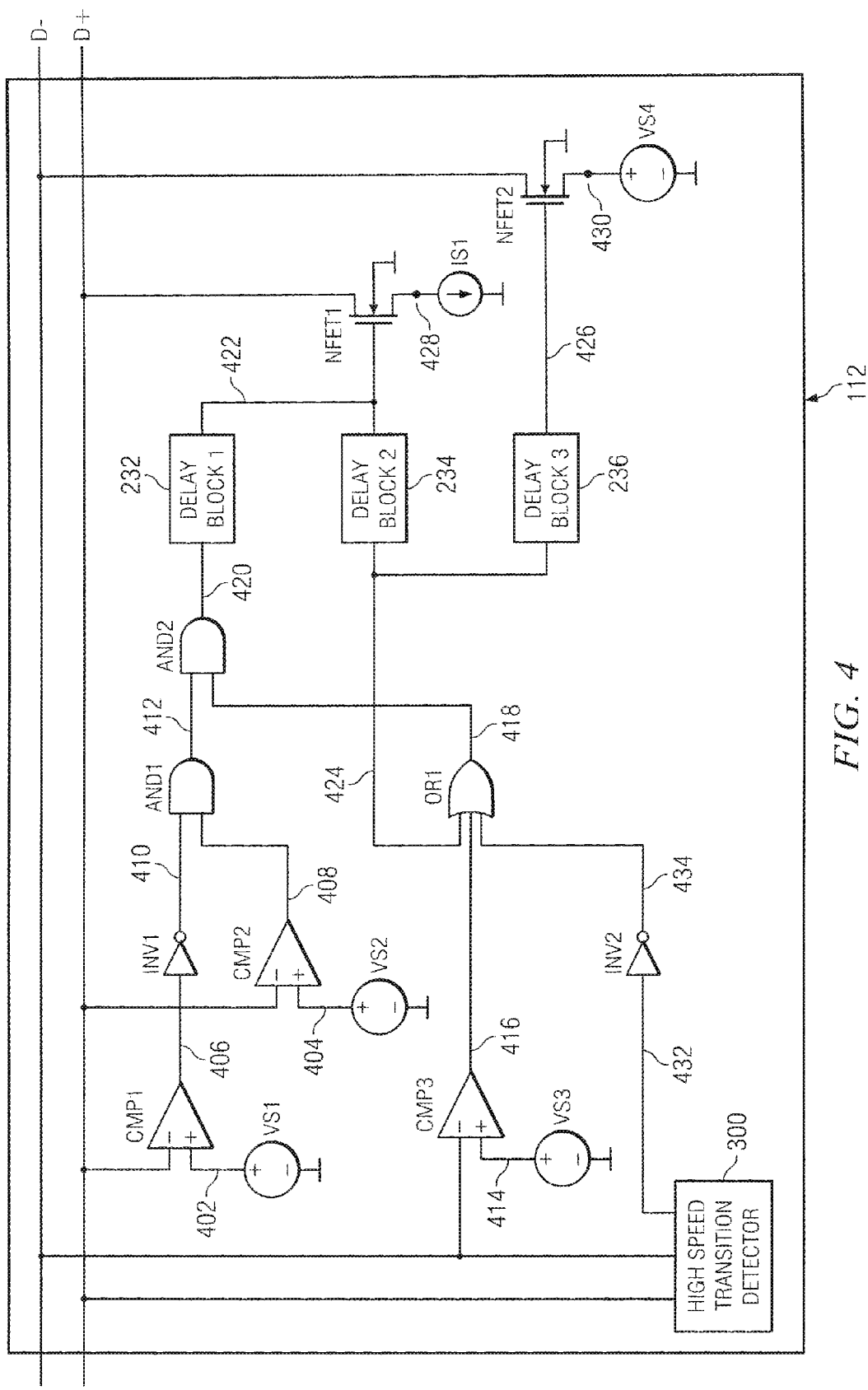
FIG. 4 is a schematic diagram of a third embodiment of a handshake circuit.

FIG. 4 is a schematic diagram of an embodiment of a third handshake circuit 112. In the third embodiment of a handshake circuit 112, node 412 is driven to logical high value when the voltage on data line D+ ranges from 0.4 volts to 0.7 volts. In this example, having a voltage range from 0.4 to 0.7 volts is part of the first part of a handshake. To drive two-input AND gate AND2 to a logical high value, node 418, along with node 412, must be driven to a logical high value. Node 418 may be driven to a logical high value when the USB client device 116 does not apply an average voltage equal to or greater than 0.130 volts or when the high speed transition detector 300 does not detect high speed transitions on data lines D+ and D−.

When nodes 412 and 418 are driven to logical high values, AND2 outputs a logical high value on node 420. Further in accordance with the third embodiment of the handshake circuit 112, when a logical high value is applied at node 420, the logical high value is propagated through delay block1 232. The delay time T1 through delay block1 232, in this example, ranges from 1 ms to 20 ms. In this example, the current source IS1 may draw current in the range of 50 micro-amps to 150 micro-amps. A logical high value is propagated through delay block2 234 to node 424. The delay time T2 through delay block2 234, in this example, is approximately 1 ms.

Because node 424 is a logical high value, the logical value on node 416 or on node 434 does not determine the logical value of the output of OR1. As a consequence, while node 424 remains high, neither the high speed transition detector 300 nor the comparator CMP3 monitors the data lines D+ and D−. The logical high value on node 424 is propagated through delay block3 236 with a time delay T3. The time delay T3, in this example, is approximately 256 microseconds. When a logical high value is applied to node 426, NFET2 turns on and voltage source VS4 is applied to data line D−. In this embodiment, the voltage source VS4 is approximately 0.6 volts.

Applying approximately 0.6 volts by the handshaking circuit 112 on data line D− is part of the second part of the handshake. In this embodiment, the handshake is complete when the USB client device 116 drives the voltage on D+ outside of the voltage range of 0.4 volts to 0.7 volts, the handshake circuit 112 waits for a time period T4, and the handshake circuit 112 decouples all voltage sources and all current sources in the handshake circuit 112 that are coupled to the data lines D+ and D− from the data lines D+ and D−.

The time delay T4, in this example, is the time it takes for the transition of a logical high value to a logical low value to propagate through delay block1 232, delay block2 234, and delay block3 236. In this embodiment, the time period T4 is approximately 1 ms with most of the delay occurring in delay block1 232. However, the total delay time T4 may be apportioned between the delay blocks 232, 234 and 236 in other ways as well. When the handshake is complete, the USB client device 116 may begin to draw charging current from the US host device 102 according to a BCS standard.

Figure 5:
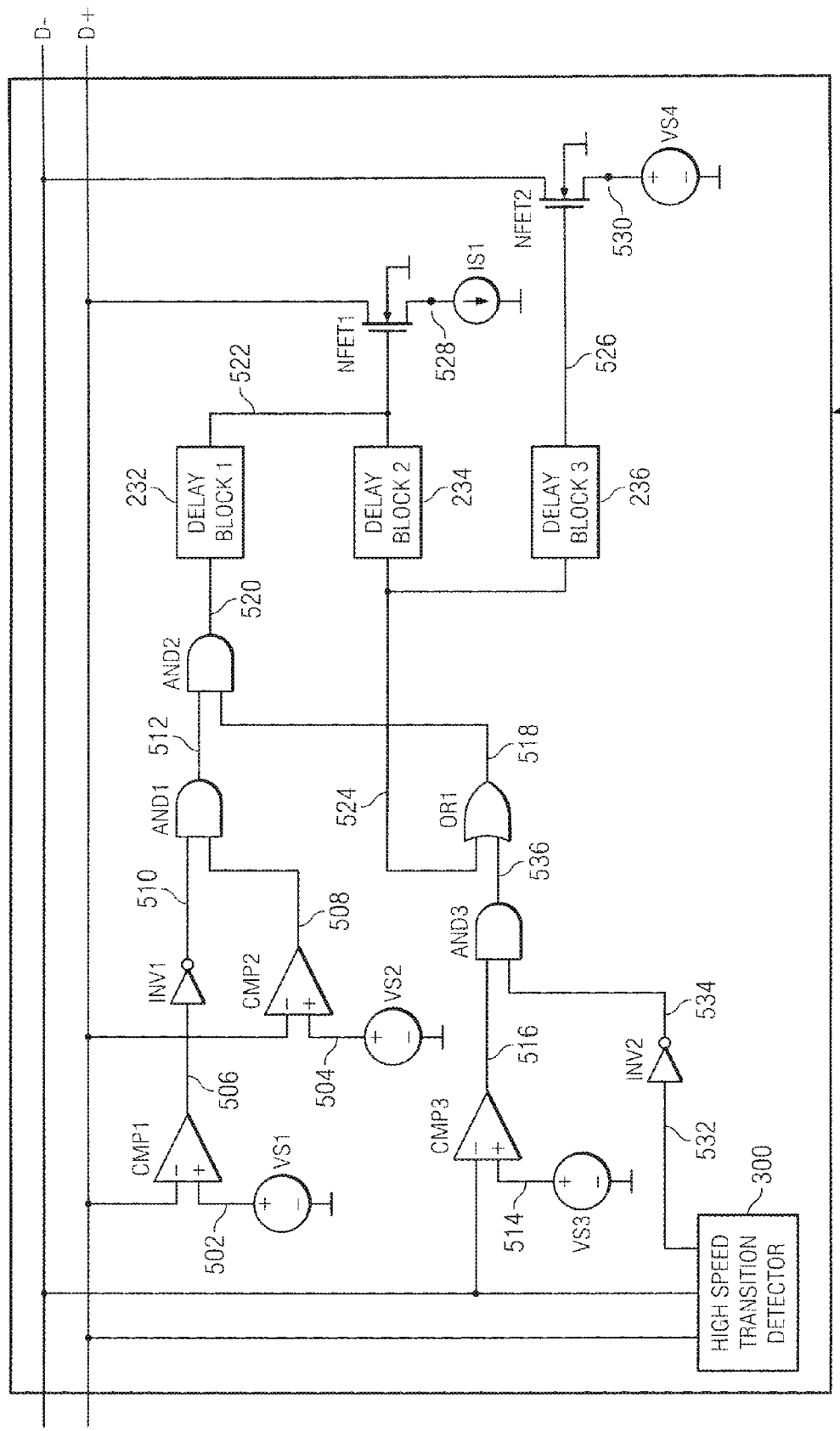
FIG. 5 is a schematic diagram of a fourth embodiment of a handshake circuit.

FIG. 5 is a schematic diagram of an embodiment of a fourth handshake circuit 112. In this fourth embodiment of a handshake circuit 112, node 512 is driven to a logical high value when the voltage on data line D+ ranges from 0.4 volts to 0.7 volts. In this example, having a voltage range from 0.4 to 0.7 volts is part of the first part of a handshake. To drive two-input AND gate AND2 to a logical high value, node 518, along with node 512, must be driven to a logical high value. Node 518 may be driven to a logical high value when the USB client device 116 does not apply an average voltage equal to or greater than 0.130 volts and when the high speed transition detector 300 does not detect high speed transitions on data lines D+ and D−.

When nodes 512 and 518 are driven to logical high values, AND2 outputs a logical high value on node 520. Further in accordance with the fourth embodiment of the handshake circuit 112, when a logical high value is applied at node 520, the logical high value is propagated through delay block1 232. The delay time T1 through delay block1 232, in this example, ranges from 1 ms to 20 ms. When a logical high value is applied at node 522, the NFET1 turns on and the current source IS1 is coupled to data line D+. In this example, the current source may draw current in the range of 50 micro-amps to 150 micro-amps. A logical high value is propagated through delay block2 234 to node 524. The delay time T2 through delay block2 234, in this example, is approximately 1 ms.

Because node 524 is a logical high value, the logical value on to node 536 does not determine the logical value of the output of OR1. As a consequence, while node 524 remains high, the high speed transition detector 300 and the comparator CMP3 do not monitor the data lines D+ and D−. The logical high value on node 524 is propagated through delay block3 236 with a time delay T3. The time delay T3, in this example, is approximately 256 micro-seconds. When a logical high value is applied to node 536, NFET2 turns on and voltage source VS4 is applied to data line D−. In this embodiment, the voltage source VS4 is approximately 0.6 volts.

Applying approximately 0.6 volts by the handshake circuit 112 on data line D− is part of the second part of the handshake. In this embodiment, the handshake is complete when the USB client device 116 drives the voltage on D+ outside of the voltage range of 0.4 volts to 0.7 volts, the handshake circuit 112 waits for a time period T4, and the handshake circuit 112 decouples all voltage sources and all current sources in the handshake circuit 112 that are coupled to the data lines D+ and D− from the data lines D+ and D−.

The time delay T4, in this example, is the time it takes for the transition of a logical high value to a logical low value to propagate through delay block1 232, delay block2 234, and delay block3 236. In this embodiment, the time period T4 is approximately 1 ms with most of the delay occurring in delay block1 232. However, the total delay time T4 may be apportioned between the delay blocks 232, 234 and 236 in other ways as well. When the handshake is complete, the USB client device 116 may begin to draw charging current from the US host device 102 according to a BCS standard.

Figure 6:
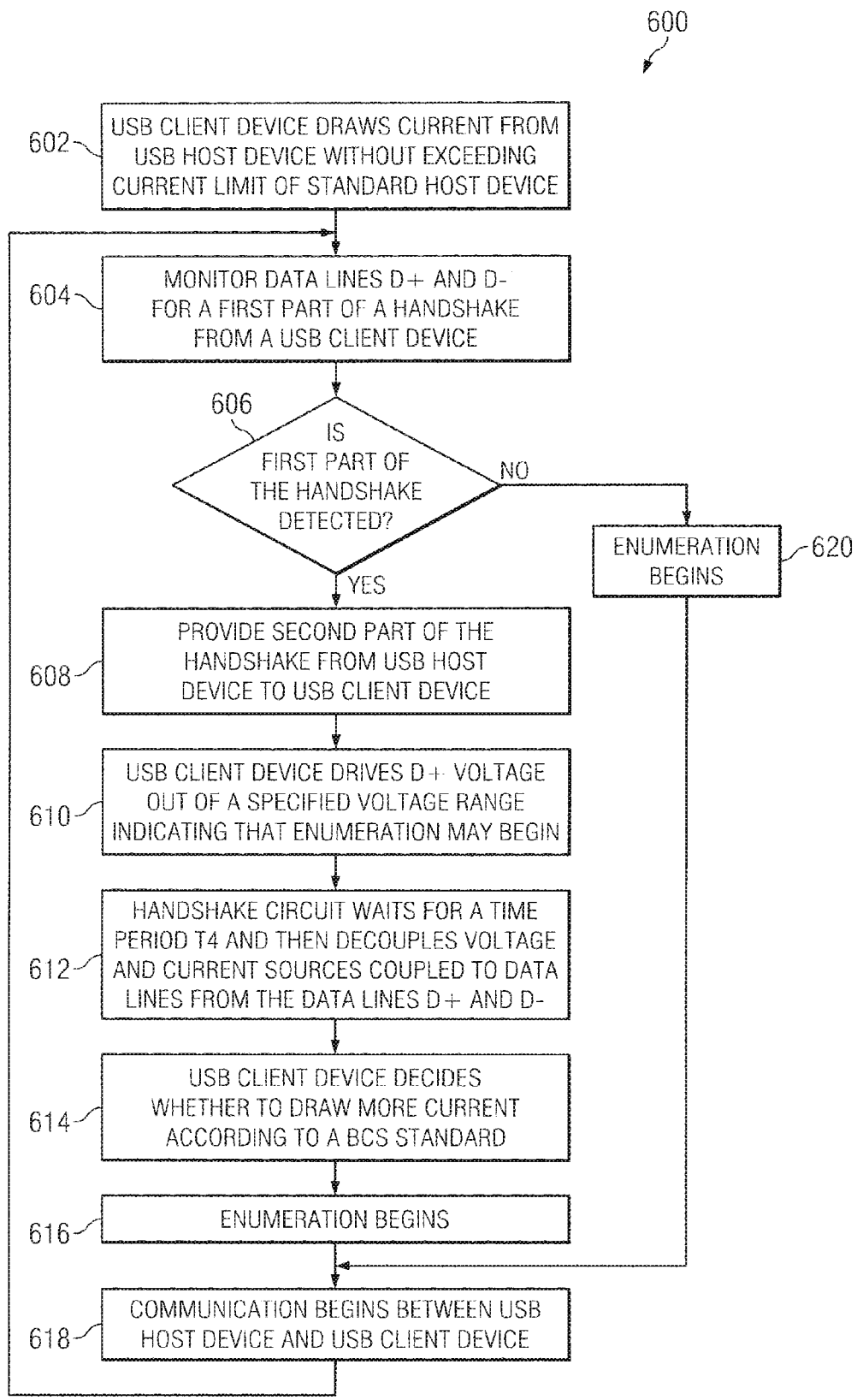
FIG. 6 is a flow chart illustrating an embodiment of a method of continuously detecting when a USB client device may be charged according to a BCS standard.

FIG. 6 is a flow chart 600 illustrating an embodiment of a method of continuously detecting when a USB client device 116 may be charged according to a BCS standard. The step 602 in the flow chart 600 indicates that power is applied from a USB host device 102 to a USB client device 116. The current supplied during this step will not exceed the maximum current allowed by a standard host port. Step 604 in the flow chart 600 indicates that a USB host device 102 monitors data lines D+ and D− for a first part of a handshake from the USB client device 116. A USB cable 118 is usually used to connect the two devices. A USB host device 102 includes but is not limited to laptop, desktop and notebook PCs. A USB client device 116 includes but it not limited to mobile handsets, keyboards and personal digital assistants.

In this embodiment, the first part of a handshake includes applying a voltage in the range of 0.4 volts to 0.7 volts to the D+ data line for time period T1 and applying no communication on the data lines D+ and D− for the time period T1. In one embodiment, applying no communication on the data lines means keeping the average voltage on the data line D− below 0.130 volts. In another embodiment, applying no communications on the data lines means applying no high-speed transitions (e.g. 480 Mbits/sec or higher) on the data lines. In another embodiment, applying no communications means no logical crossings between data lines D+ and D−. The time period T1, for example, may range from 1 ms to 20 ms.

Step 606 in the flow chart 600 determines whether the first part of the handshake has been detected. If the first part of the handshake has not been detected, enumeration begins as shown in step 620. If the first part of the handshake has been detected, the USB host 102 device provides the second part of the handshake to the USB client device 116, as shown in step 608.

The second part of the handshake includes the handshake circuit 112 drawing current from the D+ data line to ground. In this example, the current drawn from the D+ data line to ground range from 50 micro-amps to 150 micro-amps. The second part of the handshake further includes waiting a time period T2 while drawing current from the D+ data line to ground. In this example, the time period T2 is approximately 1 millisecond. After waiting for time period T2, the handshake circuit 112 discontinues monitoring the D− data line.

As part of the second part of the handshake, the handshake circuit 112 determines if the first part of the handshake is currently applied after waiting a time period T3. In this example, the time period T3 is approximately 256 microseconds. When it is determined that the first part of the handshake is currently applied, the handshake circuit 112 applies a voltage of approximately 0.6 volts to the D− data line as part of the second part of the handshake.

Step 610 in the flow chart 600 indicates that the USB client device 116 drives D+ outside of the voltage range of 0.4 volts to 0.7 volts. Step 612 in the flow chart 600 indicates that the handshake circuit 112 waits for a time period T4 and then the handshake circuit 112 decouples all current sources and all voltage sources currently coupled to data lines D+ and D− in the handshake circuit 112 from the data lines D+ and D−. Decoupling the voltage sources and the current sources from the data lines D+ and D− increases the impedance on the data lines D+ and D−. Increasing the impedance on the data lines D+ and D−, improves the bandwidth with which data may be sent and received by the USB host device 102 and the USB client device 116.

In one embodiment, the handshake is complete after steps 610 and 612 occur. After the handshake is complete, the USB client device 116 may decide to draw current from the USB host device 116 according to the proper BCS charging standard as indicated by step 614. Power is supplied by the power supply 106 through electrical connection 122 into power switch 108. Power switch 108 is continuously enabled by power switch controller 110 accept under fault or over-current conditions. Current is drawn from the power supply 106 through the Vbus to charge the USB client device 116. The current drawn from the power supply 106 is also sensed by the control circuit 110.

After step 614 ends, step 616 begins. In step 616, enumeration begins. During step 618, the USB client device 116 begins communication with the USB controller 120. In a first example, communication includes the USB client device 116 sending data on the data lines D+ and D− to the USB controller 120 and the USB controller 120 sending data on the data lines D+ and D− to the USB client device 116.

When the handshake is not complete, enumeration may begin as indicated in step 620 of the flow diagram 600 as previously discussed. After enumeration begins, the client begins communication as shown in step 618. In a first example, communication includes the USB client device 116 sending data on the data lines D+ and D− to the USB controller 120 and the USB controller 120 sending data on the data lines D+ and D− to the USB client device 116.

In step 618 of the flow chart 600, while communication takes place between the client device 116 and the controller 120, the process begins again at step 604 monitoring data lines D+ and D− for a first part of a handshake from the USB client device 116.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method for continuously detecting when a USB client device may be charged according to a Battery Charging Specification (BCS) standard comprising:
    applying power from a USB host device to the USB client device without exceeding a current limit;
    initiating a procedure, the procedure comprising:
    monitoring data lines D+ and D− for a first part of a handshake from the USB client device wherein the first part of the handshake comprises:
    applying no communication on the data lines from the USB client device and the USB host device during a time period T1; and
    applying a first voltage on the D+ data line during the time period T1 by the USB client device;
    providing a second part of the handshake from the USB host device when the first part of the handshake is detected;
    completing the handshake;
    providing current from the USB host device to the USB client device according to the Battery Charging Specification (BCS) standard;
    repeating the procedure.

2. The method of claim 1 wherein the first voltage ranges from 0.4 volts to 0.7 volts.

3. The method of claim 1 wherein the time period T1 ranges from 1 to 20 milliseconds.

4. The method of claim 1 wherein applying no communication on the data lines comprises:
    applying no average voltage on the D− line above 130 millivolts.

5. The method of claim 1 wherein applying no communication on the data lines comprises:
    applying no high-speed transitions on date lines D+ and D−.

6. The method of claim 1 wherein applying no communication on the data lines comprises:
    applying no average voltage on the D− data line above 130 millivolts; and
    applying no high-speed transitions on date lines D+ and D−.

7. The method of claim 1 wherein the second part of the handshake comprises:
    drawing a first current from data line D+ to ground;
    waiting for a second time period T2;
    discontinuing monitoring of the D− data line;
    waiting for a third time period T3;
    applying a second voltage on the D− data line while the first part of the handshake continues to be applied.

8. The method of claim 7 wherein the time period T2 is approximately 1 millisecond; and
    wherein the time period T3 is approximately 256 microseconds.

9. The method of claim 7 wherein the first current ranges from 50 micro-amps to 150 micro-amps.

10. The method of claim 7 wherein the second voltage is approximately 0.6 volts.

11. The method of claim 1 wherein completing the handshake comprises:
    the USB client device driving the voltage on node D+ outside of a voltage range;
    waiting for a time period T4;
    decoupling all voltage sources and all current sources in a handshake circuit that are coupled to the data lines from the data lines.

12. The method of claim 11 wherein the voltage range is approximately 0.4 volts to 0.7 volts.

13. The method of claim 11 wherein the time period T4 is approximately 1 millisecond.

14. The method of claim 11 further comprising:
    beginning enumeration when the handshake is complete;
    beginning communication between the USB client device and the USB host device.

15. The method of claim 1 further comprising:
    beginning enumeration when the first part of the handshake is not received.

16. An apparatus for continuously detecting when a USB client device may be charged according to a Battery Charging Specification (BCS) standard comprising:
    a handshake circuit having a first input connected to a D+ data line, a second input connected to a D− data line, a first output connected to the D+ line, and a second output connected to the D− data line;
    a USB host controller connected to the data line D+ and the data line D−;
    wherein the handshake circuit detects when a first part of a handshake is applied to the data lines by the USB client device;
    wherein when the first part of the handshake is detected, the handshake circuit provides a second part of the handshake;
    wherein when the first part of the handshake is not detected, the outputs of the handshake circuit are decoupled from the data lines and enumeration begins;
    wherein when the second part of the handshake is completed, the outputs of the handshake circuit are decoupled from the data lines and enumeration begins.

17. The apparatus of claim 16 wherein the handshake circuit comprises:
- a first comparator, the first comparator having a first input connected to a first fixed voltage, a second input connected to the first input of the handshake circuit and having an output;
- a second comparator, the second comparator having a first input connected to a second fixed voltage, a second input connected to the first input of the handshake circuit and having an output;
- a third comparator, the third comparator having a first input connected to a third fixed voltage, a second input connected to the second input of the handshake circuit and having an output;
- an inverter, the inverter having an input connected to the output of the first comparator and having an output;
- a first two-input AND gate, the first two-input AND gate having a first input connected to the output of the inverter, a second input connected to the output of the second comparator and having an output;
- a second two-input AND gate, the second two-input AND gate having a first input connected to the output of the first two-input AND gate, a second input and having an output;
- a two-input OR gate, the two-input OR gate having a first input connected to the output of the third comparator, a second input and an output connected to the second input of the second two-input AND gate;
- a first delay block, the first delay block having an input connected to the output of the second two-input AND gate and an output;
- a second delay block, the second delay block having an input connected to the output the first delay block and an output connected to the second input of the two-input OR gate;
- a third delay block, the third delay block having an input connected to the output of the second delay block and an output;
- a first NFET, the first NFET having a gate connected to the output of the first delay block, a drain connected to the first output of the handshake circuit and a source;
- a current source, the current source electrically connected to the source of the first NFET;
- a second NFET, the second NFET having a gate connected to the output of the third delay block, a drain connected to the second output of the handshake circuit and a source connected to a fourth fixed voltage.

18. The apparatus of claim 16 further comprising:
- a power supply having a first connection;
- a power switch, the power switch having a first connection connected to the first connection of the power supply, a second connection connected to a Vbus and a third connection;
- a USB connector, the USB connector having a first connection connected to the Vbus, a second connection connected to the D+ data line, a third connection connected to the D− data line, and a fourth connection connected to a ground;
- a power switch controller, the power switch controller circuit having a first connection to the third connection of the power switch and a second connection to the Vbus.

19. The apparatus of claim 16 wherein the USB host device is selected from a group consisting of a laptop computer, a notebook computer and a desktop computer.

20. The apparatus of claim 16 wherein the USB client device is selected from a group consisting of a mobile handset, a keyboard and a personal digital assistant.

* * * * *